(12) United States Patent
Anderson

(10) Patent No.: US 6,698,894 B2
(45) Date of Patent: Mar. 2, 2004

(54) SCROLLING COLOR LIGHT ENGINE WITH IMPROVED COLOR UNIFORMITY OF THE ILLUMINATION FIELD AND SINGLE PANEL PROJECTION DISPLAY SYSTEM INCORPORATING SAME

(75) Inventor: Duncan J Anderson, Sleepy Hollow, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 15 days.

(21) Appl. No.: 10/024,764

(22) Filed: Dec. 19, 2001

(65) Prior Publication Data

US 2003/0123030 A1 Jul. 3, 2003

(51) Int. Cl.$^7$ ................................................ G03B 21/00
(52) U.S. Cl. ............................ 353/31; 353/20; 353/81
(58) Field of Search ......................... 353/20, 31, 33–4, 353/69, 81, 82, 84, 98–9; 359/577, 589, 580–90, 196–7, 201; 349/5, 8, 9, 104–6; 348/739, 742–4, 756

(56) References Cited

U.S. PATENT DOCUMENTS

| 5,410,370 | A | 4/1995 | Janssen ........................ 348/756 |
| 5,416,514 | A | 5/1995 | Janssen et al. ............... 348/196 |
| 5,917,561 | A | 6/1999 | Hatanaka ......................... 349/8 |
| 5,946,114 | A | 8/1999 | Loiseaux et al. .............. 359/15 |
| 5,999,321 | A | 12/1999 | Bradley ....................... 359/587 |
| 6,191,893 | B1 | 2/2001 | Bradley ....................... 359/634 |
| 6,563,551 | B1 * | 5/2003 | Janssen et al. .............. 348/759 |

FOREIGN PATENT DOCUMENTS

| EP | 0840525 A1 | 6/1998 | ............ H04N/9/31 |
| EP | 0843487 A1 | 5/1999 | ............ H04N/9/31 |
| FR | 2699688 A1 | 6/1994 | ............ G02B/5/28 |
| JP | 09093598 | 4/1997 | ............ H04N/9/31 |

OTHER PUBLICATIONS

Coane et al.: "Run–Length Limited Parity–Check Coding for Transition–Shift Errors in Optical Recording," Global Telecommunications Conference, vol. 5, Nov. 25–29 2001, pp. 2982–2986.

* cited by examiner

Primary Examiner—Russell Adams

(57) ABSTRACT

A light engine for a single-panel scrolling-color projection system includes a source filter for filtering out unwanted components from the output spectrum of the source lamp prior to scrolling, and beam splitting filters having filtering characteristics chosen to mask the beamsteering effects caused by the angle sensitivity of the recombination filters. Such a light engine produces color stripes which maintain stable colors during scrolling, without the use of splitting and recombining filters with low angle sensitivities.

10 Claims, 7 Drawing Sheets

ORIGINAL PATH
PRIOR ART

MODIFIED PATH

SCROLLING COLOR LIGHT ENGINE WITH IMPROVED COLOR UNIFORMITY OF THE ILLUMINATION FIELD AND SINGLE PANEL PROJECTION DISPLAY SYSTEM INCORPORATING SAME

BACKGROUND OF THE INVENTION

This invention relates to light engines for color projection display systems, and more particularly relates to a scrolling color light engine for use in a single panel color projection display system.

A single panel scrolling color projection display system is characterized by a single light modulator panel such as a liquid crystal display (LCD) panel having a raster of individual picture elements or pixels, which panel is illuminated by horizontally elongated red, green and blue illumination bars or stripes. The stripes are continuously scrolled vertically across the panel while the rows of pixels are synchronously addressed with display information corresponding to the color of the then incident stripe. The modulated scrolling red, green and blue stripes are then projected onto a display screen to produce a visually integrated full color display. See, for example, U.S. Pat. No. 5,410,370, "Single panel color projection video display improved scanning" issued to P. Janssen on Mar. 25, 1994, and U.S. Pat. No. 5,416,514, "Single panel color projection video display having control circuitry for synchronizing the color illumination system with reading/writing of the light valve" issued to P. Janssen et al. on May 16, 1995.

Such single panel systems are to be distinguished from the more conventional three-panel systems, in which separate red, green and blue beams each fully illuminate and are modulated by a separate panel. The modulated beams are then superimposed on a display screen to produce a full color display. See, for example, U.S. Pat. No. 5,917,561, "Liquid-crystal image projecting apparatus having a color purity correction filter" issued to Hatanaka on Jun. 29, 1999.

Light engines for both single-panel and three-panel color projection display systems commonly utilize high intensity arc lamps to provide the level of intensity needed for a bright display, as well as dichroic filters to split the lamp light into red, green and blue components for modulation, and then to recombine the components for display.

A problem with both systems is a color varation across the image caused by the angle sensitivity of the cut-off wavelengths of the dichroic filters. That is, the wavelength at which light is reflected from the surface of the dichroic filter changes with the incident angle of the reflected light. This problem is accentuated in systems employing certain high efficiency arc lamps having emission peaks in their spectral output, such as ultra-high-pressure (UHP) lamps having a strong orange component, and xenon lamps having significant energy in both the orange and blue spectral regions.

This problem is addressed for a three-panel system in U.S. Pat. No. 5,917,561 by inserting a correction filter into the optical path at an angle of 10 degrees, which is said to compensate for the angle shift on the dichroic filters by generating a reverse effect of angle shift (column 5, lines 33 et seq.). However, in a single-panel system, the angle shift is exacerbated by the so-called "beamsteering effect", illustrated schematically in FIGS. 1A through 1C.

In these figures, a single color beam is illustrated scrolling across the panel, although in practice, each color beam red, green and blue is scrolled through a separate optical path. The ray bundle 2 that forms a stripe-shaped beam 1 is refracted by a glass prism 6, rotating about an axis normal to the plane of the drawing, and thence directed by field lenses 8, 10, and 12 through recombining dichroic filters C and D and polarizing prism 14 to panel 16.

The rotating prisms cause the stripes to scroll across panel 16 from top to bottom, causing a beamsteering effect in which the incident angles of the stripes on filters C and D to vary over a range of values, the extremes of which are larger than would be encountered in a three-panel system, in which the beam positions are fixed. For example, in the illumination path shown in FIG. 2A, the beamsteering effect results in incident angle variations at filters C and D of ±8.1 and ±5.3 degrees, respectively. For a typical angle sensitivity of −1.4 nm/degree, such variations translate in cut-off wavelength variations of up to 23 nm, which can have a significant effect upon the transmitted spectrum.

One solution to this beamsteering problem is provided in U.S. Pat. No. 5,999,321, "Dichroic filters with low nm per degree sensitivity", issued to Bradley on Dec. 7, 1999. However, the thin film dielectric stack prescribed for these filters include layers as thin as $\sim 1/16^{th}$ of a wave and must be fabricated with a high degree of accuracy.

Accordingly, it is an object of the invention to provide a solution to the beamsteering problem which does not require the use of dichroic filters having a low angle sensitivity.

SUMMARY OF THE INVENTION

In accordance with one aspect of the invention, a light engine for a scrolling color projection system includes at least one source filter to reject unwanted components from the spectral output of the light source prior to encountering any beamsteering effects, and beamsplitting filters having filter characteristics chosen to mask the beamsteering effect on the recombining dichroic filters.

In general, the cut-off wavelengths of the splitting filters are chosen to cut off the lower edge of the red spectrum and the upper edge of the blue spectrum beyond the corresponding filter edges of the recombining filters, so that the transmitted red and blue spectral components are relatively unaffected by the varying filter edges of the recombining filters. This results a relatively broad green spectrum, since the green spectrum is defined by the remaining wavelengths between red and blue. The upper and lower wavelength edges of the green spectral component can then be clamped by using one or more additional "source" filters to reject light from the illumination between the red and blue wavelength regions.

In its broadest aspects, the light engine comprises:

a light source for providing an output beam;

first and second splitting filters for splitting the output beam into red, green and blue components;

field lenses to form the red, green and blue components into beams;

first, second and third rotating prisms for scrolling the red, green and blue beams;

first and second recombining filters for recombining the red, green and blue beams; and at least one filter for eliminating undesired spectral components from the output beam prior to scrolling;

the splitting filters having filter edges chosen to mask beamsteering effects on the recombining filters.

In one embodiment, the first splitting filter reflects red light and transmits green and blue light from the source;

the second splitting filter reflects green light and transmits blue light;

the first recombining filter reflects green light and transmits red light;

the second recombining filter reflects red and green light and transmits blue light.

In the above embodiment, if a UHP lamp having a significant orange component is chosen as the light source, the preferred characteristics of the filters are as follows:

the source filter has a cut-off is about 568 nm;

the first splitting filter has a cut-off range from about 593 to 604 nm; and the second splitting filter has a cut-off of about 501 nm;

the first recombining filter has a cut-on of from about 574 to 579 nm; and the second recombining filter has a cut-off of about 518 nm.

In the above embodiment, filter O is preferable placed in the green/blue light path, between filters A and B, allowing removal of the orange peak using a simple low pass filter. Alternatively, filter O could also be positioned in the red section of the light path, assuming that filter A is designed to redirect both the red and orange spectral regions. Dichroic notch filters could also be included in the light path to block the orange peak although notch filters generally have a higher insertion loss than standard low-pass or high-pass filters.

Such a light engine for a single-panel scrolling-color projection system including a source filter for filtering out unwanted components from the output spectrum of the source lamp prior to scrolling, and beam splitting filters having filtering characteristics chosen to mask the beamsteering effects caused by the angle sensitivity of the recombination filters, produces color stripes which maintain stable colors during scrolling, without the use of splitting and recombining filters with low angle sensitivities.

In accordance with another aspect of the invention, a scrolling color projection system incorporates a light modulator panel; a light engine as provided in claim 1 for illuminating the panel; drive means for driving the light modulator panel in accordance with a display signal; and a projection lens for projecting the modulated illumination onto a display surface. Such a display system incorporating the light engine of the invention has improved color uniformity across the panel.

BRIEF DESCRIPTION OF THE DRAWING

FIGS. 2A, 2B, and 2C are schematic layouts of scrolling color light engines for a single panel color projection system, of which FIG. 2A is illustrative of the prior art and FIGS. 2B and 2C are illustrative of possible environments of the invention;

DETAILED DESCRIPTION OF THE INVENTION

Figure 1A:
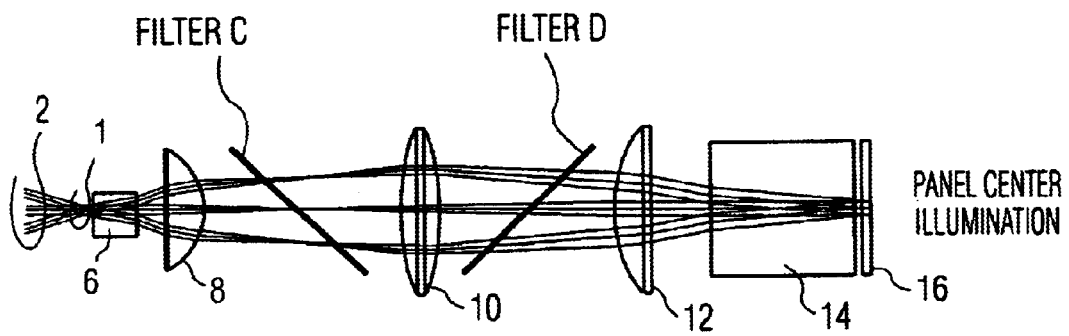
FIGS. 1A, 1B and 1C are diagrammatic views of the paths of the light beams of one color stripe of a scrolling color light engine, showing center, top and bottom illumination, respectively, of a the light modulator panel.
Figure 1B:
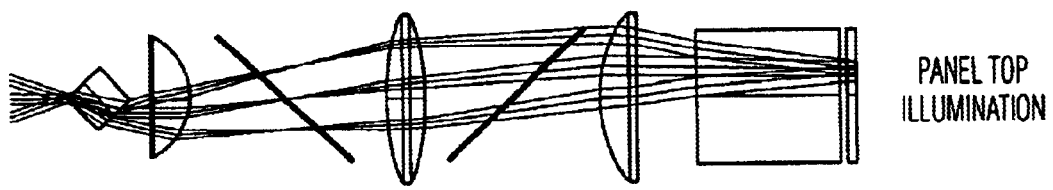
Figure 1C:
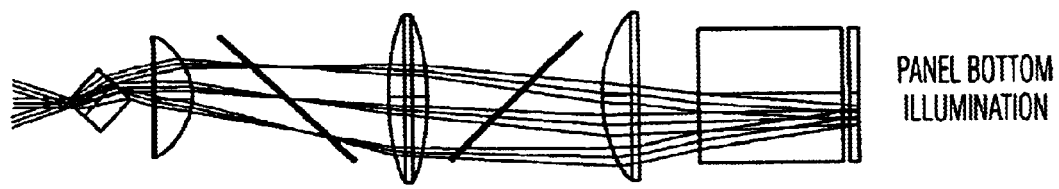
Figure 2A:
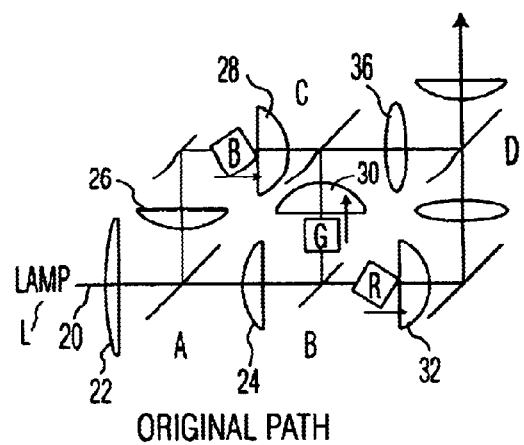
Figure 2B:
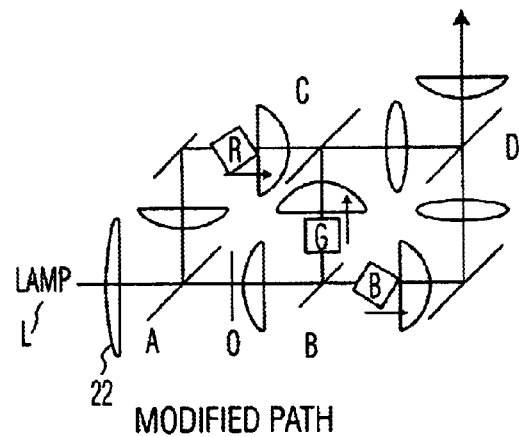

Referring now to FIGS. 2A and 2B, optical paths are shown schematically for scrolling color light engines of the prior art and for one embodiment of the invention, respectively. In both arrangements, the output beam 20 from the LAMP L, an ultra-high-pressure (UHP) arc lamp having a significant orange component, passes through condenser lens 22 and encounters beam splitting dichroic filters A and B, which split the beam 20 into red, green and blue components. Field lenses 24 and 26 form these components into beams, which are scrolled by the rotation of prisms R, G and B. The scrolling beams are further defined by field lenses 28 through 36, and recombined by recombining dichroic filters C and D.

In both of the above arrangements, the requirement for compact optics has forced the placement of filters C and D in non-telecentric pupil locations, resulting in the beamsteering effect already described. In accordance with the invention, this effect is significantly reduced by placing filter O in the beam path prior to scrolling in order to remove unwanted components from the spectral output of the LAMP, and by selecting the cut-off wavelengths of the splitting filters A and B to mask the beamsteering effect on the recombining dichroic filters C and D, allowing the use of dichroic filters with higher angle sensitivities than the special filters of U.S. Pat. No. 5,999,321.

In the original path of FIG. 2A, filter A reflects blue and transmits red and green, while filter B reflects green and transmits red, while in the modified path shown in FIG. 2B, filter A reflects red and transmits green and blue, while filter B reflects green and transmits blue. While the principles of the invention can be applied in either of these arrangements, switching of the blue and red paths, as shown in FIG. 2B, allows removal of the orange peak using a simple low pass filter in the blue/green path.

The basic functions of the dichroic filters for the modified path of FIG. 2B are listed below in Table 1, together with experimentally measured angle sensitivities and cut-off wavelengths. The first filter A can be chosen to either reflect red wavelengths of light or, if the position of the lamp is adjusted, to transmit red wavelengths. Red transmissive filters are generally less sensitive to angle variations than red reflective filters. Use of the filters of Table I in the arrangement of FIG. 2B results in uniform primary colors across the panel, as indicated by a color stability $\Delta C < 0.015$, where $\Delta C$ represents the root-mean-square deviation of color in the 1960 CIE color space (u v).

TABLE 1

Description of filter functions for the modified path. (ΔC < 0.015)

| Filter Type | | Function | Typical angle sensitivity of filter edge nm/deg | Cut-off wavelength (nm) | Filter EdgeΔλ (nm) |
|---|---|---|---|---|---|
| A | Short or LONG pass | Separates red by reflection or (TRANSMISSION) from blue and green | −2.5 or (−1.4) | 593 | 18 |
| B | Short pass | Separates green by reflection from blue | −1.4 | 501 | 20 |
| C | Long pass | Combines red by transmission with green by reflection | −1.4 | 574 | 20 |
| D | Short pass | Combines blue by transmission with reflected red and green | −1.1 | 518 | 20 |
| O | Short pass (0 degrees angle of incidence) | Reflects orange peak back towards the lamp. Transmits blue and green | −0.3 | 568 | 20 |

Figure 6:
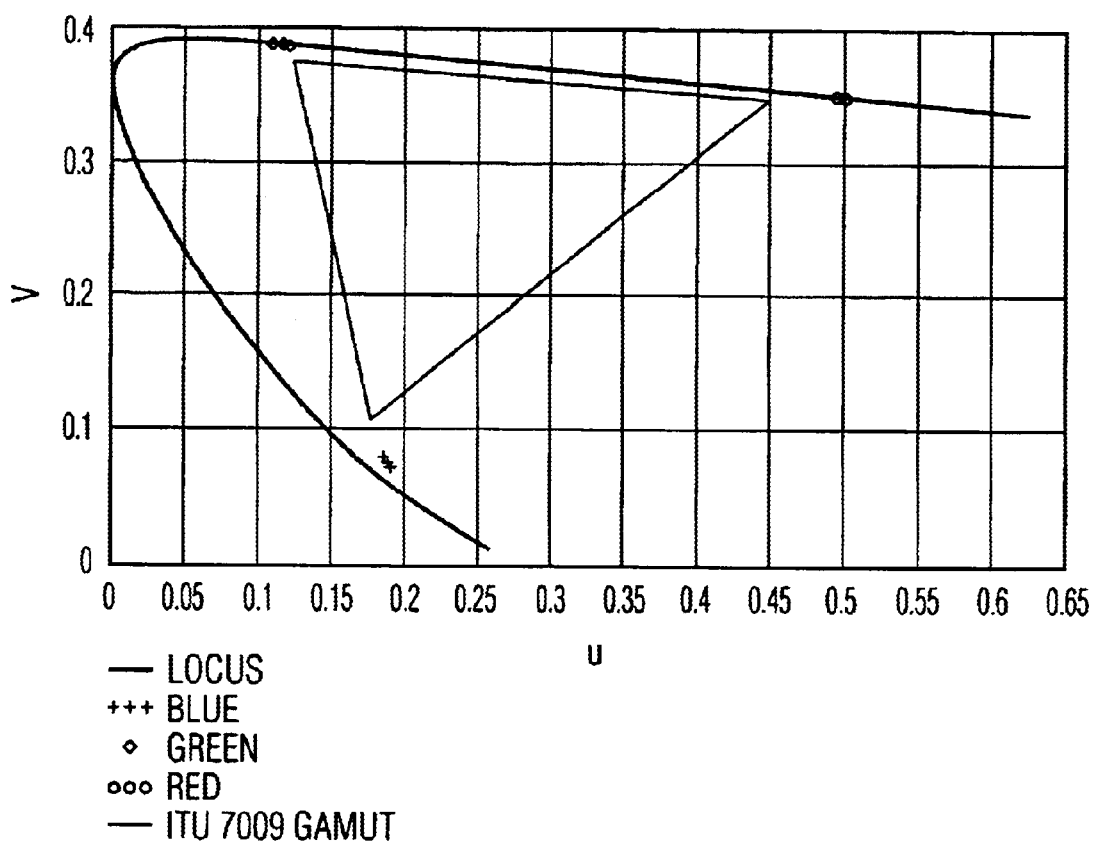
FIG. 6 is a graph showing the color coordinates of the illumination of the light engine of the invention and the ITU 709 color gamut.

The color coordinates of illumination at the top, center and bottom of the panel resulting from the use of the above filters are shown relative to the standard ITU 709 color gamut in the 1960 CIE color space (u v) in FIG. 6. As can be seen, the filters of the invention result is a larger color gamut which comfortably encompasses the ITU standard.

An even more stringent color stability (AC<0.01) is achieved using the filters of Table 2.

TABLE 2

Filters for the modified path (ΔC < 0.01)

| FILTER | | $\lambda_{50\%}$ (nm) | FILTER EDGE Δλ (nm) | ANGLE SENSITIVITY (nm/deg) |
|---|---|---|---|---|
| A | CUT-OFF | 604 | 18 | −2.5 |
| B | CUT-OFF | 501 | 20 | −1.4 |
| C | CUT-ON | 579 | 20 | −1.4 |
| D | CUT-OFF | 518 | 20 | −1.1 |
| O | CUT-OFF | 568 | 20 | −0.3 |

The above filter characteristics were chosen with the aid of a model which was implemented using MathCad software. The model multiplies various transmission and reflection dichroic filter spectra as a function of the stripe position on the panel and takes into account the F/# of the optical beam at each dichroic filter. The model also requires the angle sensitivity; filter cut-off wavelength; width of the filter edge, and AOI at each dichroic filter as a function of stripe position on the panel. The model also assumes a constant intensity distribution across the illuminating pupil, and 100% transmission or reflection away from the filter edge. The model predicts the transmitted spectral characteristics of the primary colored stripes as a function of panel position.

Figure 3:
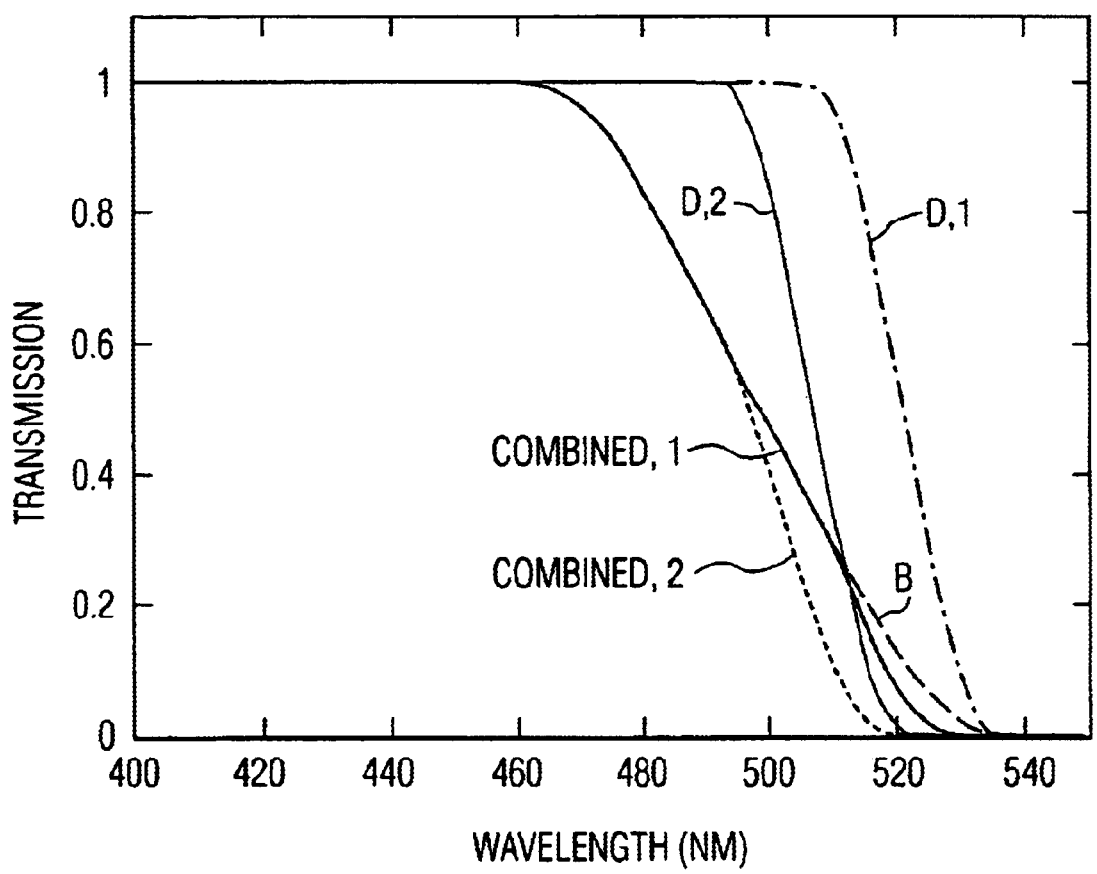
FIG. 3 is a graph of transmission spectra showing the blue dichroic spectra in the layout of FIG. 2B.
Figure 4:
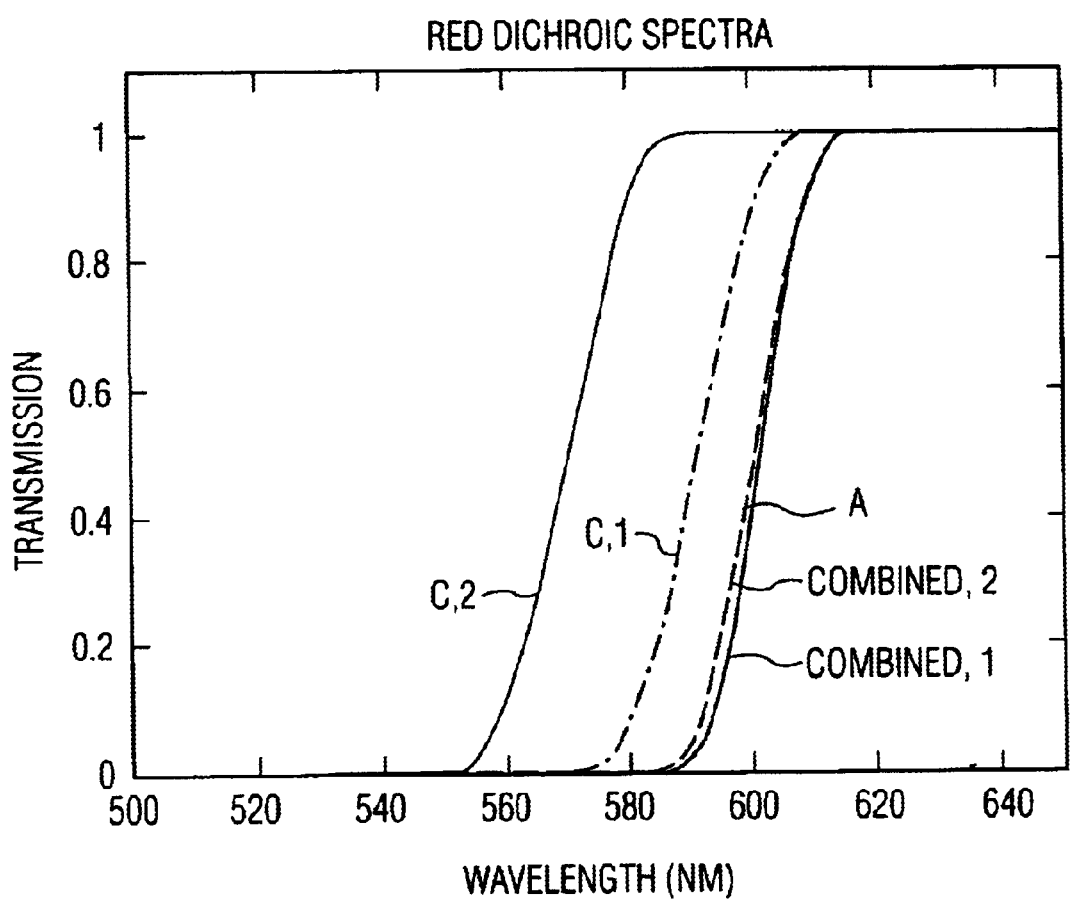
FIG. 4 a graph of transmission spectra showing the red dichroic spectra in the layout of FIG. 2B.
Figure 5:
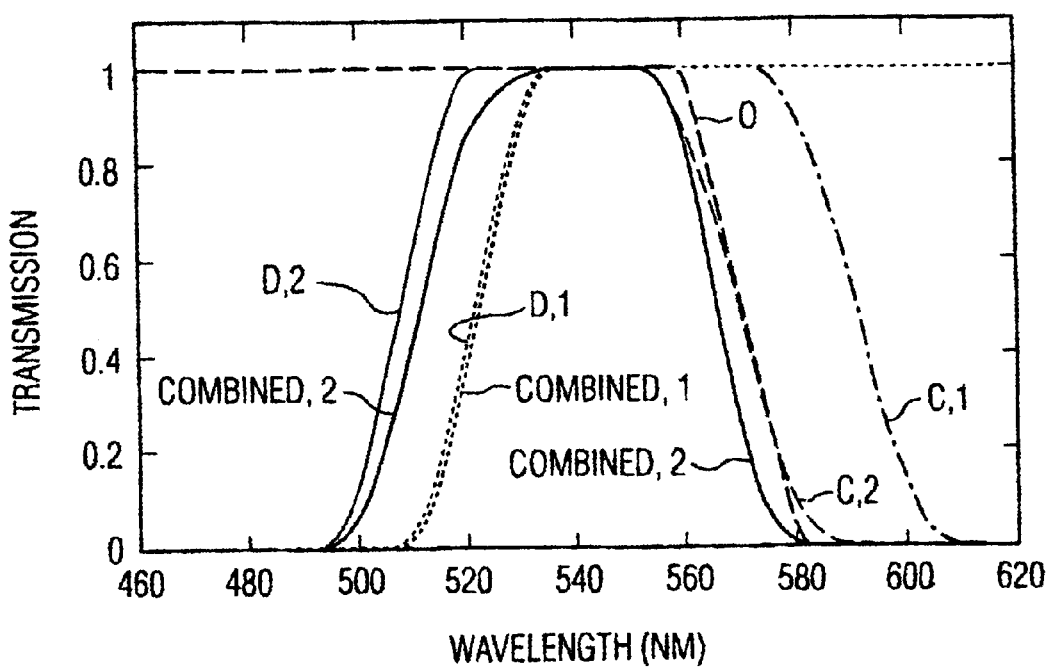
FIG. 5 a graph of transmission spectra showing the green dichroic spectra in the layout of FIG. 2B.

The effects upon dichroic transmission spectra for each of the primary colors red, green and blue, as a function of panel position (top: position 1; bottom: position 2) is illustrated by the theoretical curves shown in FIGS. 3, 4 and 5. The filter specifications shown in Table 1 are used to create these plots.

FIG. 3 shows the blue transmission spectra for: filter B; filter D for positions 1 and 2; and combined filters B and D for positions 1 and 2. The curves for D, 1 and D, 2 denote the shifting D cutoff filter edge for the top and bottom of the panel respectively. The shift in the effective spectrum for filter D produces minimal impact on the overall transmission spectra for the blue since the cut-off wavelength of filter B is less than the minimum cut-off wavelength of filter D. Hence a stable blue primary spectrum can be achieved.

FIG. 4 shows the red transmission spectra for: filter A; filter C for positions 1 and 2; and combined filters A and C for positions 1 and 2. The curves for C, 1 and C, 2 denote the shifting C filter edge for the top and bottom of the panel respectively. The shift in the effective spectral edge for filter C produces minimal impact on the overall transmission spectrum for the red since the cut-off wavelength of filter A is greater than the maximum cut-off wavelength of filter C. Hence a stable red primary spectrum can be achieved.

FIG. 5 shows the green transmission spectra for: filter C for positions 1 and 2; filter D for positions 1 and 2; combined filters C and D for positions 1 and 2; and filter O. The blue and red primaries have been effectively fixed by ensuring that there is at least one other fixed filter edge that determines the band edge of that primary color. However the shifting filter edges of combined filters C and D can cause unacceptable color shifts for both the lower and upper part of the effective green wavelength passband.

Inspection of the illuminating 120 Watt UHP lamp power spectrum, shows that the spectral peak around 550 nm dominates the green primary. The shifting passband on the lower wavelength edge produces little change in the projected color since there is relatively little optical energy in this region compared to the 550 nm peak. However, significant energy is present from an orange peak at around 580 nm at the upper wavelength edge of the passband. The effective shift in the upper wavelength filter edge of combined filters C and D produces significant color changes on this side of the green passband. However, low-pass filter O masks this shift in the upper wavelength filter edge without significantly clipping the remaining green spectral peak.

Figure 2C:
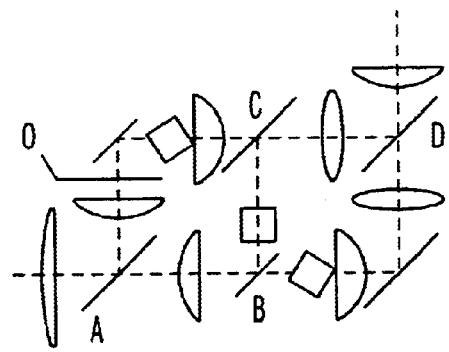

Alternatively, filter O could also be positioned in the red section of the light path, as shown in FIG. 2C for example, assuming that filter A is designed to redirect both the red and orange spectral regions. Dichroic notch filters could also be included in the light path to block the orange peak although notch filters generally have a higher insertion loss than standard low-pass or high-pass filters.

Figure 7:
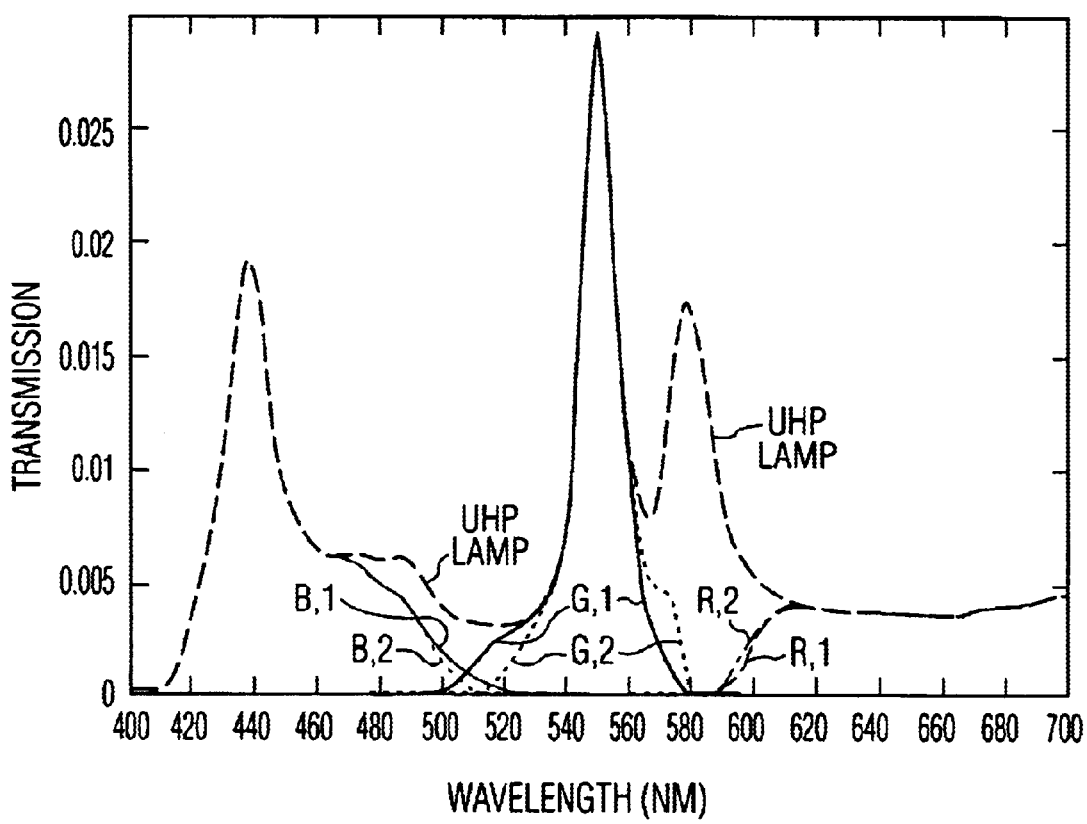
FIG. 7 is a graph of transmission spectra showing the primary color output spectra of the light engine of the invention relative to that of the light source.

FIG. 7 illustrates the output spectra of the red, blue and green primary colors illuminating the panel in positions 1 and 2, relative to the output spectrum of the UHP lamp. It can be seen that the beamsteering effect has been minimized, leading to a relatively stable output of the primary colors. Output components of the UHP lamp between the red and green peaks, as well as between the blue and green peaks, have been largely reduced and at around 580–590 nm, substantially eliminated.

Figure 8:
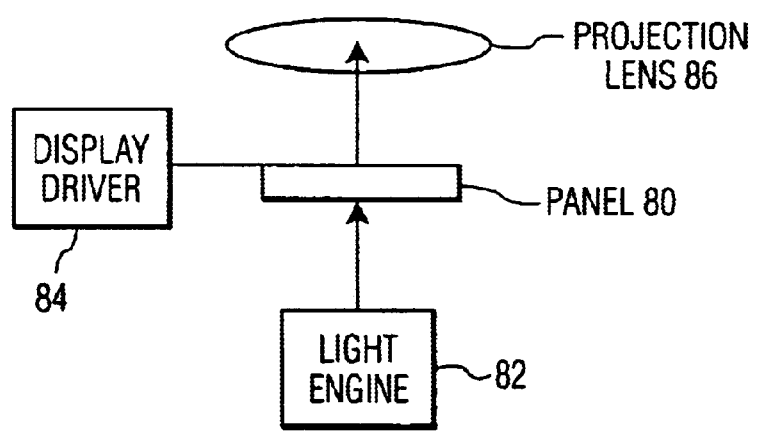
FIG. 8 is a schematic layout of a single panel color projection display system incorporating a scrolling color light engine of the invention.

FIG. 8 illustrates in block diagram form a projection display system of the single-panel scrolling-color type, in which LCD Panel 80 is illuminated with scrolling stripes of the primary colors red, green and blue, the scrolling stripes generated by Light Engine 82 in accordance with the teachings of the invention. LCD Panel 80 modulates the illumination from the stripes in accordance with a display signal from Display Driver 84. The modulated light from the Panel is transmitted to a display surface by Projection Lens 86.

The invention has necessarily been described in terms of a limited number of embodiments. From this description, other embodiments and variations of embodiments will become apparent to those skilled in the art, and are intended to be fully encompassed within the scope of the invention and the appended claims. For example, high intensity sources other than the UHP lamp could be employed, such as a xenon lamp, which in addition to an orange component has a strong blue component to be filtered out by an appropriate source filter.

What I claim as my invention is:

1. A light engine for a scrolling color projection system comprising:

a light source for providing an output beam;

first and second splitting filters having filter edges for splitting the output beam into red, green and blue components having upper and lower wavelength edges;

field lenses to form the red, green and blue components into red, green and blue beams;

first, second and third rotatable prisms for scrolling the red, green and blue beams;

first and second recombining filters having filter edges for recombining the red, green and blue beams; and at least one source filter having at least one filter edge for eliminating undesired components from the output beam prior to scrolling;

the filter edges of the splitting filters chosen to mask beamsteering effects on the recombining filters.

2. The light engine of claim 1 in which:

the filter edges of the first and second splitting filters are chosen to cut off the lower wavelength edge of the red component and the upper wavelength edge of the blue component beyond the corresponding filter edges of the first and second recombining filters, so that the transmitted red and blue components are relatively unaffected by the filter edges of the recombining filters, and the filter edge of the source filter is chosen to eliminate components from the output beam in the wavelength region between the lower wavelength edge of the red component and the upper wavelength region of the blue component.

3. The light engine of claim 1 in which:

the first splitting filter reflects red light and transmits green and blue light from the source;

the second splitting filter reflects green light and transmits blue light;

the first recombining filter reflects green light and transmits red light;

the second recombining filter reflects red and green light and transmits blue light.

4. The light engine of claim 3 in which the source filter is located between the first splitting filter and second splitting filter.

5. The light engine of claim 4 in which the source filter is a low pass filter.

6. The light engine of claim 5 in which:

the light source is a UHP lamp;

the source filter has a cut-off of about 568 nm;

the first splitting filler has a cut-off of from about 593 to 604 nm; and the second splitting filter has a cut-off of about 501 nm;

the first recombining filter has a cut-on of from about 574 to 579 nm; and the second recombining filter has a cut-off of about 518 nm.

7. The light engine of claim 4 in which the first splitting filter reflects both red and orange light, and the source filter is positioned between the first splitting filter and the first recombining filter.

8. The light engine of claim 1 in which the source filter is a notch filter.

9. The light engine of claim 1 in which the source is a xenon lamp.

10. A scrolling color projection system comprising;

a light modulator panel;

a light engine as provided in claim 1 for illuminating the panel;

drive means for driving the light modulator panel in accordance with a display signal; and a projection lens for projecting the modulated illumination onto a display surface.

* * * * *